United States Patent [19]
Vonderhaar

[11] 3,810,483
[45] May 14, 1974

[54] REMOVABLE OVEN DOOR SEAL
[75] Inventor: Arthur W. Vonderhaar, Mansfield, Ohio
[73] Assignee: The Tappan Company, Mansfield, Ohio
[22] Filed: Nov. 14, 1972
[21] Appl. No.: 306,213

[52] U.S. Cl............... 126/190, 49/479, 49/482
[51] Int. Cl. ............................................ F24c 15/02
[58] Field of Search .............. 126/190; 49/479, 482; 24/90 HA

[56] References Cited
UNITED STATES PATENTS
3,404,675  10/1968  Payne ................................ 126/190
2,671,935  3/1954  Flues .................................. 49/479
3,029,805  4/1962  Scott .................................. 126/190

Primary Examiner—Carroll B. Dority, Jr.
Assistant Examiner—Larry I. Schwartz
Attorney, Agent, or Firm—Donnelly, Maky, Renner & Otto

[57] ABSTRACT

The seal includes a sleeve of silicone rubber or the like and metal hook-like retainers at the sleeve ends which are cemented to the sleeve and engage in slots provided in the seal support surface. The sleeve length is normally about 20 percent shorter than the spacing of the slots, so that the sleeve is stretched in the mounting and held under tension as installed to conform closely to and bear firmly against the surface.

1 Claim, 4 Drawing Figures

PATENTED MAY 14 1974 3,810,483

REMOVABLE OVEN DOOR SEAL

This invention relates to a removable oven door seal of the type shown in U.S. Pat. Nos. 3,029,805 and 3,404,675.

The seal of the first such patent is very simply and economically comprised of a sleeve of silicone rubber or the equivalent and a metal retainer strip threaded through the sleeve and having attaching tabs projecting at the respective ends. Openings are provided in the door or confronting frame surface on which the seal is to be mounted at a spacing which corresponds approximately to the length of the sleeve, and the mounting is accomplished by flexing the seal and inserting the end tabs in such openings.

In order to improve the mounting in particular, so that the seal will conform to and be held more firmly against the door or frame surface, the seal of the second such patent was developed. This improved seal comprises a basically comparable resilient sleeve, but the retainer strip is replaced by a pair of relatively short metal retainers inserted respectively in the end portions of the sleeve and having their interior lengths angularly barbed to resist withdrawal by biting into the sleeve. The projecting ends of the two retainers are formed to serve as attaching tabs as in the first patented seal form, but in this case the openings in the supporting surface are spaced apart a distance which is slightly greater than the length of the sleeve, so that the latter is stretched in the mounting and thus held against the surface under tension.

A primary object of the present invention is to provide a further improved form of the seal which will permit it to be stretch mounted under more tension and thus with better sealing engagement with the supporting surface. Such improvement involves different connections of the retainers with both the sleeve and the supporting surface in attachment to the same, and the resilient sleeve body configuration is also altered to enhance the sealing engagement with the confronting surface.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
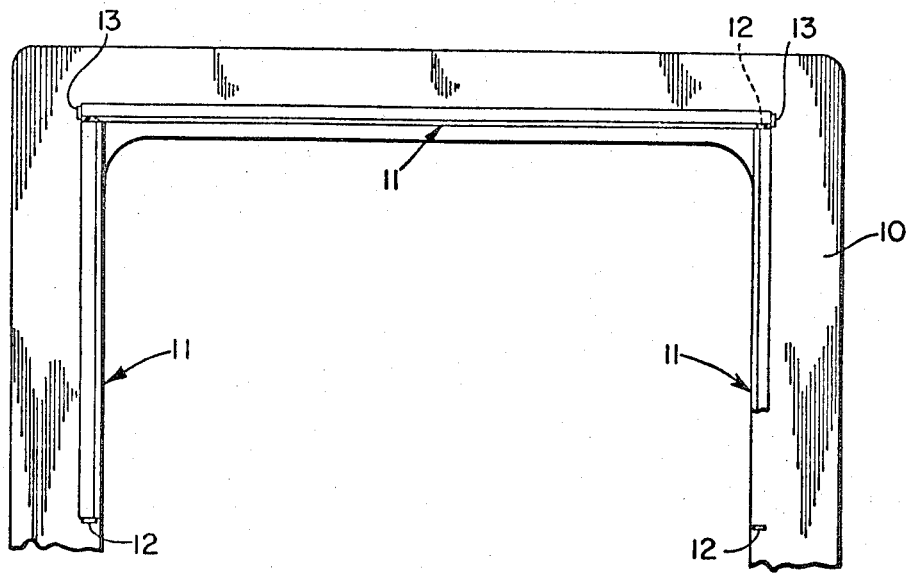
FIG. 1 is a fragmentary front elevation of a front wall or frame of an oven provided with seals in accordance with the present invention.
Figure 2:
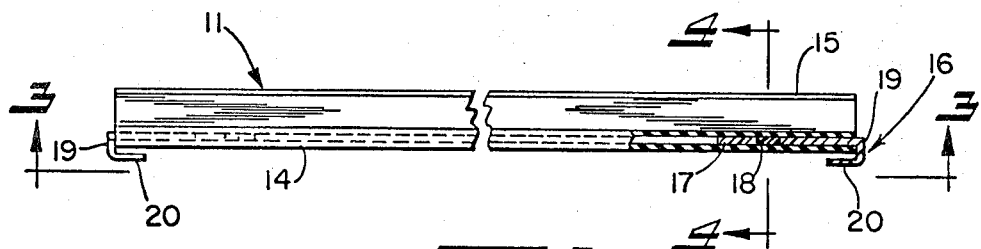
FIG. 2 is a fragmentary and partially broken side elevation of one of the new seals.
Figure 3:
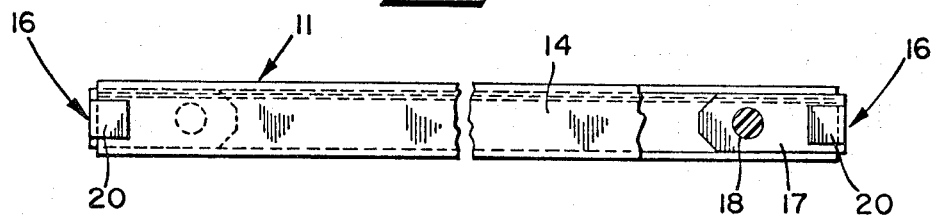
FIG. 3 is a top plan view of the seal of FIG. 2 as indicated by the line 3—3 in the latter, with partial breaking away of one end portion.

Referring now to the drawing in detail, reference numeral 10 represents a portion of an oven front frame as presented to the inner liner of a door, not shown, but with the disposition of the seals thereon indicating that such door would be of conventional bottom hinged type. The door and the oven are of course not material to the present invention, and it will also be appreciated that the seals might be applied to the inner door liner as well as to the oven as indicated in the drawing.

In this particular array, three seals 11 of identical form are detachably mounted against the surface of the frame to provide a continuous line of sealing about the sides and top or, generically, about the opening of the frame except for the side of the door hinge connection. The frame is provided with horizontal slots 12 coincident with the ends of the seal at each side and with vertical slots 13 coinciding with the ends of the top seal, the latter overlying the upper ends of the side seals as shown for the desired continuity of the sealing engagement.

Figure 4:
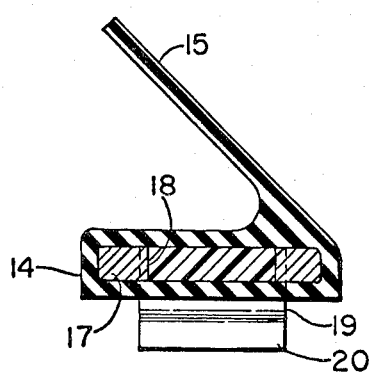
FIG. 4 is a transverse cross-section of the seal as viewed from the plane of the line 4—4 in FIG. 2, with enlargement of the scale.

Each seal 11 comprises an elongated body having as its major part a sleeve 14 which is generally of hollow rectangular cross-sectional shape. An integral wing part 15 extends from an upper corner at an angle of 45° substantially fully over the major sleeve part as most clearly evident in the enlarged section of FIG. 4. Such body is made of a high temperature resiliently deformable material, with silicone rubber preferred and other examples being polytetrafluoroethylene and polychlorotrifluoroethylene. The wing part is coextensive with the sleeve part and of course presents a shape which can be readily extruded.

A metal retainer 16 is inserted in and projects from each end of the sleeve body 14. The two retainers are identical and have insert sections 17 which correspond in sectional dimensioning closely to the sleeve interior for snug fit with the same, and transverse holes 18 are provided in such sections. The projecting end 19 of each retainer is bent downwardly or to the side of the seal away from the wing part and then inwardly parallel to the sleeve to form an attaching hook. The retainers are inserted in the sleeve ends as far as possible, so that their hook-like attaching parts are very close to the sleeve ends, and the spacing between the seal body and the rebent parts 20 of the retainers is small but adequate conveniently to accommodate the thickness of the oven frame or other surface to which the seal is to be applied. The retainers are anchored in the seal by cementing, with silicone rubber adhesive used for the preferred silicone rubber sleeve body, and the cement carried in the holes 18 and of course providing through bonding of the adjacent top and bottom portions of the sleeve 14.

The stretch mounting desired of course means that the length of each resilient seal should be less by a predetermined amount than the distance between the holes in the supporting surface which define the locations for the seal ends as mounted, and the mounting obviously is accomplished by first hooking one retainer in one end slot and then stretching the body for hooking of the other end retainer. It is preferred that the seal have a normal length which is about 20 percent shorter than its installed length.

The appreciably greater tension which can thus be realized with the new seal as compared to that shown in U.S. Pat. No. 3,404,675 provides a much closer conformation of the seal to the mounting surface and hence improved sealing. It is the purpose of the wing part to provide an extremely flexible added thickness of the sealing material for better conformity to the confronting surface. Attachment is more positive, and the plastic welding which anchors the retainers in the sleeve body of course does not involve any potential weakening of the seal or wear concern.

I, therefore, particularly point out and distinctly claim as my invention:

1. In oven construction including a door and a frame having confronting surfaces, means for sealing the door when closed, said means comprising an elongated seal body made of an elastic material which is stable at the temperatures of operation of the oven, at least the end portions of said body being hollow, and a pair of retainers respectively engaged with said end portions; the improvement which comprises providing each of said retainers with an insert section having continuously smooth edges and at least one transverse perforation, said insert sections being snugly fitted in the body end portions and anchored by cementing of the body within said end portions, with the cement extending through said perforation, said retainers further having projecting ends which are rebent in spaced parallel relation to the body end portions and internal ends which are of a reduced transverse cross section relative to the major extent of the retainers to facilitate installation of said retainers in said seal body, and the seal being removably mounted on one of said surfaces under sufficient tension to experience an elongation on the order of about twenty per cent, with the rebent ends of its retainers hooked in openings in such confronting surface, thereby to hold said seal firmly against said surface with end to end positive sealing conformance therebetween.

* * * * *